United States Patent [19]

Lindstrom

[11] 3,918,412

[45] Nov. 11, 1975

[54] FUEL TREATMENT FOR COMBUSTION ENGINES

[76] Inventor: Olle B. Lindstrom, Lorensviksvagen 14, Vigbyholm, S-18363 Taby, Sweden

[22] Filed: Sept. 14, 1973

[21] Appl. No.: 397,165

Related U.S. Application Data

[63] Continuation-in-part of Ser. No. 137,562, April 26, 1971, abandoned.

[30] Foreign Application Priority Data

Sept. 14, 1970 Sweden.............................. 6000/70

[52] U.S. Cl. .................. 123/3; 48/106; 123/119 A
[51] Int. Cl.² ........................................ F02B 43/08
[58] Field of Search........ 123/119 A, 119 E, 3, 1 A, 123/121, 122, 133; 60/39.12, 39.02; 48/106, 212

[56] References Cited
UNITED STATES PATENTS

| | | | |
|---|---|---|---|
| 1,630,048 | 5/1927 | Balachowsky et al........... | 123/119 E |
| 1,717,767 | 6/1929 | Diaz................................ | 123/119 E |
| 1,795,037 | 3/1931 | Portail............................. | 123/119 E |
| 2,201,965 | 5/1940 | Cook ............................... | 123/3 |
| 2,655,786 | 10/1953 | Carr................................ | 60/39.12 |
| 2,749,223 | 6/1956 | Harrington...................... | 123/133 |
| 3,186,394 | 6/1965 | Ramun............................ | 123/122 D |
| 3,294,073 | 12/1966 | Bressan........................... | 123/119 A |
| 3,635,200 | 1/1972 | Rundell........................... | 123/3 |
| 3,682,142 | 8/1972 | Newkirk ......................... | 123/3 |
| 3,717,129 | 2/1973 | Fox ................................. | 123/119 E |
| 3,828,736 | 8/1974 | Koch............................... | 123/3 |

*Primary Examiner*—Charles J. Myhre
*Assistant Examiner*—David D. Reynolds
*Attorney, Agent, or Firm*—Burns, Doane, Swecker & Mathis

[57] ABSTRACT

Polluting components in exhausts from combustion engines are reduced through a reforming reactor placed between the fuel supply and the engine. Fuel prior to delivery to the combustion chamber of the engine is passed through the reforming reactor at a temperature between about 250°C. and about 1000°C. and in the presence of a reforming catalyst and water to convert in the reforming reactor at least a part of the fuel to carbon monoxide and hydrogen by reaction with steam. A portion of the flow of exhaust gas from the combustion engine is delivered to the reforming reactor and therein mixed with the fuel delivered to the reforming reactor.

13 Claims, 2 Drawing Figures

FUEL TREATMENT FOR COMBUSTION ENGINES

RELATED APPLICATIONS

This application is a continuation-in-part of application Ser. No. 137,562, filed Apr. 26, 1972, now abandoned.

BACKGROUND OF THE INVENTION

1. Field of the Invention

This invention relates to Otto cycle internal combustion engines and, more particularly, to methods and apparatus for reducing the amount of polluting components in exhausts from combustion engines.

2. State of the Art

The conventional passenger car with an Otto cycle internal combustion engine is responsible for a substantial part of the air pollution in industrialized countries. Many hundreds of components have been identified in exhaust gases from automobile engines. The most dangerous components from an environmental quality standpoint are, in general, carbon monoxide, unburned hydrocarbons (both heavy and light), oxides of nitrogen, and particulate material, including lead compounds (when gasoline with organic lead compounds or additives is used as fuel). Because of the great danger to health that these atmospheric contaminants or impurities from passenger vehicles constitute, more stringent demands and regulations concerning permissible discharge are being made.

Because these demands and regulations are being made more and more stringent, it has been anticipated that structural or mechanical solutions such as better fuel injection, recycling of exhaust gases, afterburning of unburned materials in the exhaust, and the like will not be sufficient. It has also been predicted that a final catalytic stage must be adopted so that the exhaust gases are substantially freed of carbon monoxide, and of unburned hydrocarbons. This development toward a final catalytic stage leads indirectly to the elimination of the lead problem. That is, the catalysts that are being considered are poisoned by lead. Automobile manufacturers, therefore, have decided to reduce the compression ratio of the engine so that 91 octane gasoline, without lead additives, can be used.

The oxides of nitrogen present a harder problem to solve catalytically. In this case, attempts are usually made to hold temperatures in the combustion chamber as low as possible by exhaust recycling, water injection, or the like.

It is possible, however, that the measures indicated above which are known to those skilled in the art will not be sufficient to hold impurities or contaminants in exhausts to an acceptable level, partly in view of the population growth and partly in view of the rising living standards in the world which may have the effect that the number of cars will increase faster than the population. Attention, therefore, has focused on fuels other than gasoline. For example, ammonia, hydrogen, methanol or the hydrogen/carbon monoxide mixture which may be obtained by the so-called reforming of methanol, i.e., the catalytic reaction of methanol with steam, have been considered. Mixtures of carbon monoxide and hydrogen can be used, with relatively simple modifications, as fuel for combustion engines such as the conventional Otto cycle internal combustion engines, and it has been found that the exhaust gases have much lower amounts of carbon monoxide and hydrocarbons.

SUMMARY OF THE INVENTION

Accordingly, a primary object of the present invention is to utilize the concept of using carbon monoxide and hydrogen as fuel for combustion engines so that the exhaust gas content of unburned hydrocarbons, carbon monoxide, oxides of nitrogen, and the like are substantially reduced or essentially eliminated.

Other objects and advantages of the present invention will become apparent to one skilled in the art from the following summary of the invention and description of the preferred embodiments:

In accordance with the present invention, a method and apparatus for reducing the amount of harmful or polluting components in the exhaust flow that comes from an Otto cycle internal combustion engine are provided in which fuel, before it is delivered in gaseous state to the combustion zone or chamber of the engine, is passed through a reforming reactor with a reforming catalyst disposed therein, preferably at a temperature between about 250° and about 1000°C., to convert at least a part of the fuel to carbon monoxide and hydrogen by reaction with water (as steam). The invention is characterized in that a portion, preferably between about 5 and about 50%, of the exhaust flow from the combustion engine is delivered to the reforming reactor and mixed there with the fuel delivered to the reforming reactor. The heat content of the exhaust gas is used for the energy requirement of the reforming reaction which is endothermic. The steam present as a combustion product in the recirculated exhaust gas will necessarily take part in the reforming reaction. When the reforming reaction is carried out in the presence of a large quantity of carbon dioxide, some of the carbon dioxide may also react with the fuel in side reactions giving carbon monoxide, hydrogen, etc. in addition to the products of the reforming reaction.

A certain combustion of fuel and/or reforming reaction products may also occur in the reactor. In such a case, air, as required, is also introduced into the reforming reactor. This combustion of fuel and the products of the reforming reaction is so adapted that the reforming reaction is substantially isothermal at a suitable reforming reaction temperature that varies according to the type of reforming catalyst and fuel. For example, the reforming reaction may range from about 200° to 300°C. for methanol up to about 1000°C. for hydrocarbons, or above that range for other fuels as may be required.

The reactor may also be heated by delivery of combustion gases from a combustion burner or by disposition of the reactor in a surrounding combustion chamber. Any extra supply of heat may also be effected by other techniques, e.g., with use of combustion tubes in the catalyst chamber of the reactor, by electric heating elements, or the like. Heat may also be supplied directly from the non-circulated portion of the exhaust gas by heat exchange via tubes in the reactor or the like.

These and other aspects of the present invention will be readily apparent to one skilled in the art to which the invention pertains from the claims and the following more detailed description of preferred embodiments when read in conjunction with the appended drawing.

DESCRIPTION OF THE PREFERRED EMBODIMENTS

Figure 1:
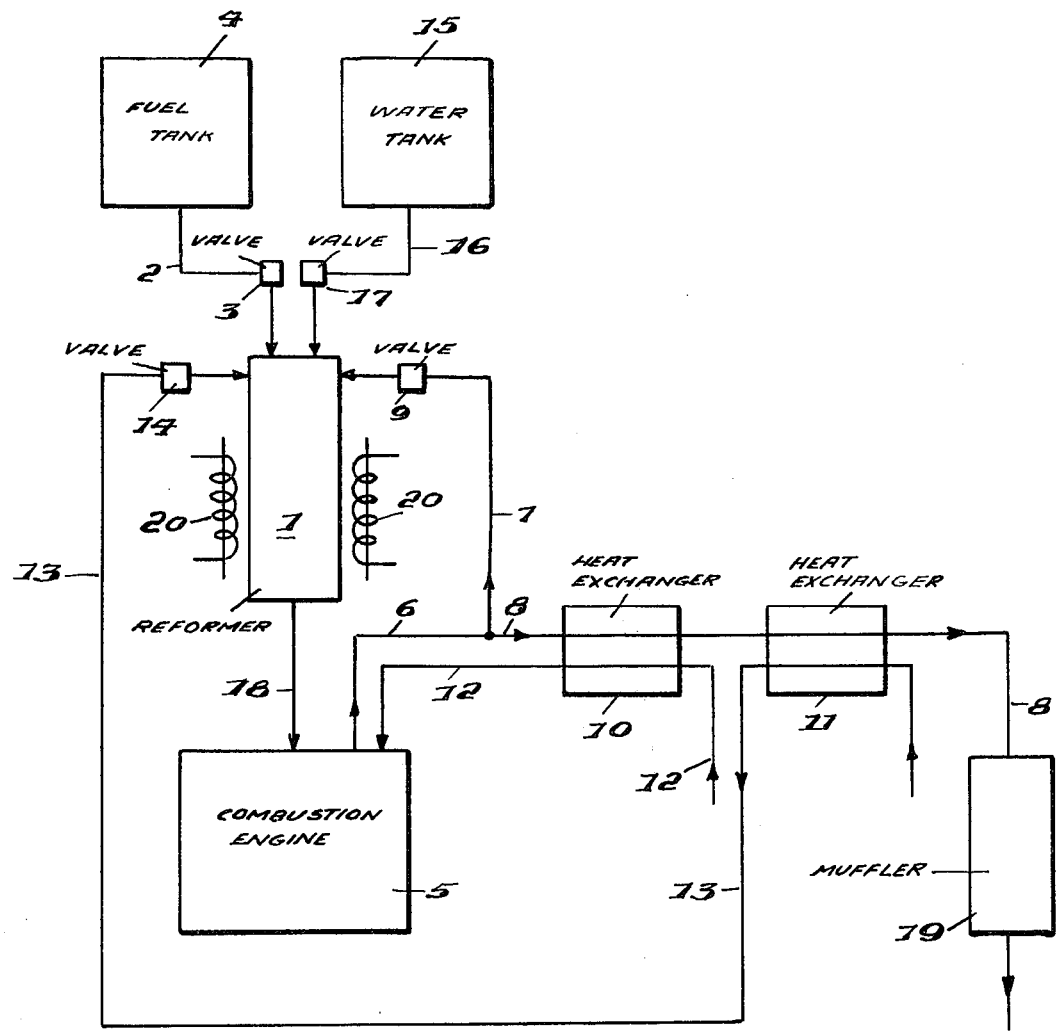
FIG. 1 is a schematic representation of novel apparatus for reducing the pollutants issuing from a combustion engine.

FIG. 1 schematically indicates a reforming reactor 1, to which fuel is delivered via a conduit 2 with a valve or metering device 3 from a fuel tank 4. The flow of exhaust gas from a combustion engine 5 passes off via a conduit 6 and is then divided into two lines via conduits 7 and 8. Flow in conduit 7 is taken via a flow control device 9, which may be a throttle, a valve or the like, to the reforming reactor 1. It will be apparent that the control device 9, by throttling action, valve action, or the like, will change the flow characteristics otherwise inherent in the assembly, i.e., under normal, uncontrolled, circumstances a certain amount of flow will take place through lines 7 and 8; however, operation of the control device 9 will vary the amount of flow through these lines. The other exhaust flow is vented, i.e., goes to the outer atmosphere, via conduit 8 which contains heat exchangers 10 and 11 and a muffler 19. The system for heat recovery represents one of several obvious possibilities to realize good fuel economy according to the invention. The heat exchanger 10 preheats air or other oxygen-containing gas that is delivered to the combustion engine through a conduit 12. Possible additional air or other oxygen-containing gas for the reforming reactor may pass through a conduit 13 equipped with a flow regulating device 14 and may also be preheated by a heat exchanger 11. Additional heat recovery may occur, for example, from the fuel gas that is delivered to the combustion engine from the reforming reactor. The water or steam that is necessary for the reforming reaction may be supplied or delivered to the reforming reactor 1 mixed with the fuel, exhaust gas, or air. At least part of the steam requirement of the reforming reaction is supplied by the steam always present as a combustion product in the recirculated exhaust gas. Any additional water as needed for the reforming reactor may be delivered from a water tank 15 via a conduit 16 equipped with a flow control device 17 to the reforming reactor. Fuel gas issuing from the reforming reactor 1, which contains reaction products and possibly unreacted fuel, is delivered to the combustion engine 5 through a conduit 18. If desired, the gas passing through conduit 18 may be cooled prior to delivery to the combustion chamber. The net production of reaction products and unreacted components, e.g., nitrogen, in conduit 18 passes off through the muffler 19 to the outside. Electrical resistance heating elements 20 may be provided to maintain the desired reforming reaction temperature. The non-recirculated exhaust gas stream in conduit 8 may obviously also furnish heat to the reforming reaction by a heat exchange by means of tubes arranged in the reactor or the like.

The structural form and dimensioning of the system according to the embodiment that is schematically indicated in FIG. 1 is, of course, dependent upon the type and size of the combustion engine, the type of fuel, permitted exhaust emissions, and other design considerations known to those skilled in the art.

The flow control devices 3, 9, 14 and 17 indicated in FIG. 1, which control the flow of the materials to the reforming reactor 1, can advantageously be driven electrically by control pulses from an electronic controller (not shown) that regulates the flow both with respect to the requirements of the combustion engine 5 and the reforming reactor 1 as well as the state of the reforming reaction. The reforming reactor may be made by well known techniques using well known structural materials. See, for example, *Kirk-Othmer Encyclopedia of Chemical Technology*, 2nd ed., vol. 10, pp 415–426 (Interscience, New York), and also Swedish Pat. No. 324,629, which are both incorporated herein by reference.

Advantageously, the reforming reactor may be heat insulated, to aid in maintaining isothermal reaction conditions. The reforming reactor may also be surrounded by a blanket of the exhaust gas.

Reforming catalysts well known per se in the petrochemical art are used. For example, noble metals such as platinum, and transition metals such as nickel or cobalt on ceramic supports or active carbon, oxide catalysts such as nickel/thoria compositions, and the like, are well known steam reforming catalysts. The reforming catalyst charge may also be supplemented by catalysts that are active for conversion or reaction of carbon monoxide with steam to form carbon dioxide and hydrogen, if it is desired to increase the hydrogen content of the fuel mixture to the engine at the expense of carbon monoxide content. Reforming of petrochemicals with steam has per se long been known and for sake of brevity and clarity is not discussed in greater length herein. For a further discussion of reforming, reforming catalysts, and other general process design considerations, see, for example, the references cited above, as well as *Reaction Kinetics for Chemical Engineers*, Walas, McGraw-Hill, New York (1959).

It has been found advantageous to deliver a flow of exhaust to a reforming reactor that amounts to between about 5% to about 50% of the exhaust from the combustion engine, which gives an acceptable balance among the various design considerations such as fuel economy and exhaust emission content. A flow relationship that is often especially suitable is between 10 and 25%.

Typically, the amount of fuel that is converted to carbon monoxide and hydrogen in the reforming reactor is greater than 10% of the amount of fuel delivered to the reforming reactor. Depending upon exhaust emission requirements, the degree of conversion in the reactor can be held to a relatively low value, even down to about 10% with full power takeoff. In such cases, it may also be possible to completely avoid any extra delivery of water to the reforming reactor with the steam present in the recirculated exhaust gas serving as the sole source of water for the reforming reaction, thus affording a simpler system which leads to a significant reduction in the bulk of the overall reforming reactor system.

Increasing the flow of exhaust gas to the reforming reactor obviously has the consequence that the content of inert gases in the combustion engine chamber increases with concomitant lower combustion temperatures and with lower efficiencies. The demand concerning degree of conversion in the reforming reactor and the desired value with respect to recycled exhaust gas may dictate, as mentioned above, any extra need for water in addition to the water which is supplied as steam in the recirculated exhaust gas.

In starting the engine, it is possible to temporarily by-pass the reforming reactor and allow the fuel (from the fuel tank) to go directly and conventionally into the combustion engine until the operating temperature of the reforming reactor is reached through recycle of exhaust gases. This bypass technique requires that the combustion engine be equipped with a conventional fuel system so the engine may be operated in a conventional way during start-up. It is then also possible to operate the fuel system according to the invention, the principle of which was described in the discussion relating to FIG. 1, in parallel with the conventional fuel system. This mode of operation may sometimes give a good compromise between economic and environmental aspects as described below. When it is desired to get the maximum environmental benefit of the invention it is, however, recommended not to use an auxiliary conventional system for start-up (and possibly also during steady state operation), but to rely solely on a system according to FIG. 1 whereby all of the fuel for the engine passes through the reforming reactor. One route to reduce emissions during start-up is to store some of the produced fuel gas in a gas tank which stored gas may be fed to the engine during heating up of the reforming reactor. This technique will maintain emissions during start-up at the low, steady state operation level. If desired, reactor operating temperatures may be more quickly achieved by causing some combustion of the fuel in the reforming reactor by providing air to the reactor as indicated above. (Such combustion may also be suitable for regeneration of the catalyst in the reforming reactor and for burning away soot and other deposits as is done in known petro-chemical systems.)

A significant advantage of the present invention is that the system can work multifarious types of fuels and mixtures thereof, such as lower alcohols, e.g., methanol and ethyl alcohol; various hydrocarbons, e.g., lower alkanes such as methane and butane; and known petroleum fractions and fuels such as gasoline, kerosene and diesel oil. The composition of the gas that is delivered to the combustion engine may in general be kept fairly constant independently of the composition of the initial fuel fed to the reforming reactor and may contain substantial amounts of hydrogen as produced in the reforming reactor.

Another significant advantage of the present invention is that it has a very high degree of operational efficiency and shows an improved life expectancy compared with alternative systems for the reduction of emissions with exhaust gases. It may be noted that conventional systems with a catalytic reactor following the combustion engine must handle an exhaust gas that contains a great number of compounds that are formed in the complicated combustion processes in the combustion engine. This leads among other things to the production of tars and other products that cause the efficiency of the catalyst to deteriorate even in the absence of any lead additive in the gasoline. In the present invention, the exhaust gases that issue from the combustion engine are relatively clean so that the reaction in the reforming reactor occurs under controllable and clean conditions, thus contributing to the minimization of the occurrence of reaction inhibiting deposits and to a longer life for the combustion engine. It is also thought that the combustion gas that goes to the combustion engine is actually more reactive than the initial non-treated fuel, perhaps because of a residue of reactive intermediate products. In a similar way the reforming reaction seems to be accelerated by reactive products in the exhaust gas from the combustion engine.

High degrees of fuel conversion will increase the octane number of the fuel fed to the Otto engine to levels above 100 in spite of the absence of anti-knocking agents like lead compounds and the like. High degrees of conversion automatically produce the well known advantages of operation of Otto engines on gaseous fuel, e.g., no fuel condensation, less corrosion, no dilution of lubricating oils, longer life with less maintenance, etc.

Since part of the heat in the exhaust gas is recovered in the endothermic reforming reaction the fuel economy may sometimes surpass that for a conventional Otto engine with no means for emission control.

The most unexpected result is, however, that even fairly modest degrees of conversion of the fuel in the reforming reactor produce a large reduction in emissions from the Otto engine, particularly the emission of nitrogen oxides. Similar emission reductions are found when part of the fuel is supplied to the engine in the conventional manner and part of the fuel through the reforming reactor. There is no theory at present which explains this beneficial effect. Although I do not wish to be bound by any theoretical considerations, the explanation appears to be in the combustion conditions which are characteristic of the Otto cycle internal combustion engine. Besides the thermal effect which is related to the dilution of the fuel-air mixture caused by the recirculated exhaust stream there are chemical effects the nature of which is not yet known. It may be a question of homogeneous catalysis particularly during the initial steps of the combustion in the engine which contributes to a more complete combustion at the same time as the content of nitrogen oxides is kept on a low level. Also, simultaneous operation of a conventional liquid fuel feed system and the system of the invention may produce a kind of a stratified charge effect in the Otto cycle engine with a rich zone surrounded by a lean mixture containing the reformed fuel. This effect may be ennanced by having separate inlets for the reformed and fuel and the nonreacted fuel-air mixtures.

The specific embodiment to be described in the following is building on the circumstances mentioned above which are based on the spirit of my invention. This embodiment is of a particular advantage for the practical case involving a compromise between emission and cost. A particular advantage of this specific embodiment is that it can be simply adapted to conventional combustion engines according to the state of the art.

In this specific embodiment, one portion of the fuel is conducted to the combustion engine in the conventional way through a carburetor or other means for fuel feed whereas a second portion of the fuel passes through a reforming reactor where at least part of the fuel is converted to carbon monoxide and hydrogen by reaction with water vapor by means of recirculating between 5 and 50% of the exhaust flow from the combustion engine into the reforming reactor where it is mixed with said portion of fuel supplied to the reforming reactor. A special feature of this particular embodiment is the arrangement of the reforming reactor in the exhaust system whereby it is at least partly in heat exchange with the hot exhaust gases from the combustion engine which are not recirculated to the combustion engine via the reforming reactor. Heat exchange means heat transfer from one medium, for instance that portion of the exhaust stream which goes to the muffler to a second medium, in this example, the contents of the reforming reactor, through the walls of the reforming reactor.

Figure 2:
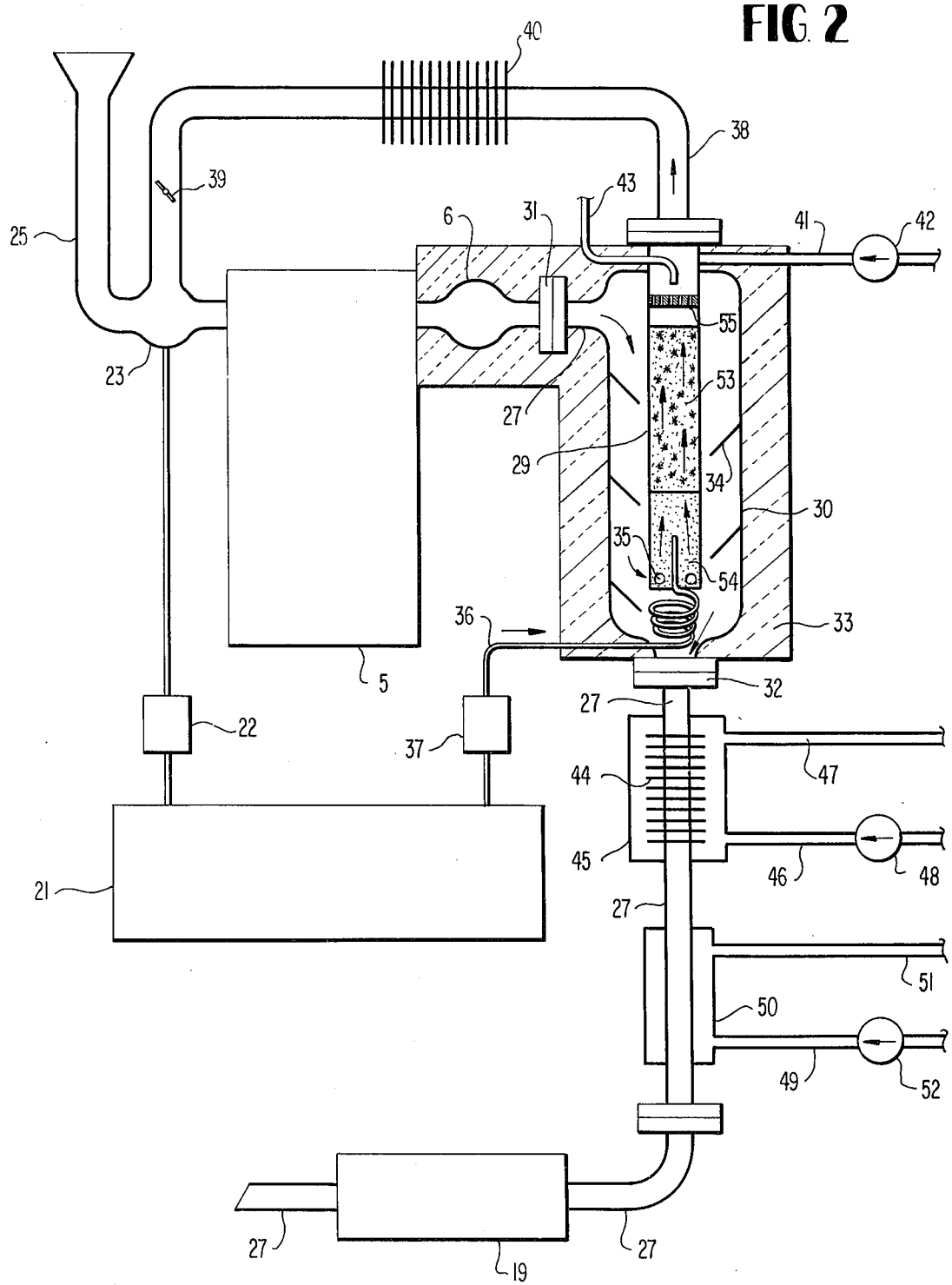
FIG. 2 shows a specific embodiment of the invention.

This embodiment is schematically described in FIG. 2. One portion of a fuel is conducted in known manner from the fuel tank 21 via carburetor 22 to the inlet pipe 23 of the Otto cycle internal combustion engine 5. Air is conducted in known manner to the inlet pipe via the pipe 24. The exhaust gas from the outlet pipe 6 of the combustion engine is passed through the pipe 27 which contains muffler 19 in the same manner as the conventional exhaust system for combustion engine of the kind used, for example, on passenger cars.

Reforming reactor 29 is located in the exhaust pipe 27 physically as close to the outlet pipe 6 of the combustion engine 5 as possible so that the exhaust from the combustion engine is not cooled down too much before its entrance into the reforming reactor 29. This portion 30 of the exhaust pipe 27 is connected with flanges 31 and 32, respectively, to the outlet pipe 6 and the continuation of the exhaust pipe 27, respectively. The reactor 29 is thus surrounded also by exhaust gas which is not carried into the reforming reactor whereby part of the heat content in this gas is also utilized for the reforming reaction. At the same time the heat losses from the reforming reactor 29 to the surroundings are reduced so it can be kept at a high operating temperature. This part of the exhaust system is preferably equipped with heat insulation 33 which can be a multilayer insulation, ceramic insulation, etc. Baffles 34 can with advantage be arranged in the exhaust pipe to give the exhaust gas a rotating movement when it passes the reforming reactor to prevent introduction of particulate matter into the reforming reactor.

Part of the exhaust stream (i.e., from 5 to 50%) is conducted according to the invention into the reforming reactor 29 through the holes 35 in the walls of the reactor. Fuel is carried to the reforming reactor 29 via the pipe 36 which is equipped with a pump 37 for feeding fuel to the reforming reactor 29 generally in proportion to the amount of fuel which is carried directly to the combustion engine through carburetor 22. The pump 37 must overcome the over-pressure in the exhaust system. It is therefore recommended to use a plunge or membrane pump with an output which is made proportional to the rpm of the motor possibly through mechanical coupling to suitable gears. The pump 37 can of course also be powered by an electric motor. In addition, the delivery function of the pump 37 can be combined with the carburetor 22 to feed fuel directly to the inlet pipe 23 such as by utilizing direct injection fuel delivery systems.

The pipe 38 from the reforming reactor 29 to the inlet pipe 23 of the combustion engine 5 can be equipped with a throttle 39 or similar device for control of the exhaust flow. The throttle 39 can be operated manually or automatically for control of the exhaust recirculation to the engine. The pipe 38 may be equipped with cooling flanges 40 or the like to reduce the temperature of the gas mixture which is conducted to the inlet pipe 23.

The reforming reactor 29 can also be equipped with suitable means for regenerating the reactor bed such as, for example, the connection 41 for supply of air blown by blower 42 for burning away of coke, etc. and a special connection 43 for the supply of fuel for this regenerative operation. Combustion gases from the regeneration leave the exhaust pipe in the same way as the exhaust at normal operation.

Since exhaust emission is particularly great during the engine startup, it is desirable that the reforming reactor 29 becomes operative as soon as possible. This can take place, e.g., by heating up the reactor before or during start-up through direct combustion by means of the catalyst regeneration equipment. At the same time regeneration of the catalyst will obviously take place.

During cold weather, the reforming reactor can also serve as a heat source for motor and coupe heaters by means of heat exchangers where the reactor is used as a carburetor. For example, incoming cold air in line 46 is forced by fan 48 into box 45 into indirect heat exchange with the exhaust gas in flanged pipe 44. Warm air is withdrawn to the coupe through line 47.

The cooling water system of the engine can in the similar way be connected via the pipe 49 which carries cooling water through the heat exchanger 50 back to the motor via the pipe 51. The circulation can in known manner be produced by means of the circulation pump 52. The system can be connected and controlled by conventional systems used with coupe and motor heaters and known to those skilled in the art.

The reforming reactor 29 contains the catalyst charge 53 and may also contain a section 54 with a non-catalytic filling which filling serves to filter off particulate matter in the exhaust stream. Introduction of particulate matter into the internal combustion engine 5 can be prevented by means of a gas filter 55 which can be made as a grid of heat resistant material to filter the gas prior to its introduction into the combustion engine.

One characteristic feature of this embodiment is that the reforming reactor 29 is in heat exchange with the exhaust gases which do not enter into the reforming reactor. The reforming reactor 29 is thus arranged in the exhaust pipe 27 and is completely surrounded by exhaust gas. It is also possible to invert this arrangement and arrange the reforming reactor 29 around the exhaust pipe 27. Intermediate embodiments between these two arrangements are also possible for instance an embodiment with a reforming reactor arranged as a cylinder according to FIG. 2 but with a central channel for the portion of the exhaust stream which is not carried to the reactor. The heat exchange surface can also be increased by utilizing a tube reactor with the charge of catalyst arranged in tubes surrounded by exhaust gas or vice versa. Other modifications will be apparent to those skilled in the art.

The invention shall be exemplified further with a system installed on a Opel Rekord automobile model year 1960. The reforming reactor is connected to the internal combustion engine in the manner shown in FIG. 2. The volume of a catalyst charge amounts to 1000 cm$^3$ and the catalyst is made of activated nickel oxide precipitated on pellets of aluminum oxide with 5 mm diameter. At full power of about 50 hp, the total fuel flow is 15 kg/h of petroleum of which 8% or 1.2 kg/h is introduced into the reforming reactor via an electrically driven injection pump. 15% of the exhaust flow from the motor is recirculated via the reforming reactor. The fuel for the reforming reactor is vaporized and preheated to about 200°C. before its entrance into the reactor in which the reaction temperature amounts to about 600°C. About 0.5 kg of fuel are reacted in the reactor mostly to hydrogen and carbon monoxide. The gas mixture which is introduced into the inlet pipe into the motor contains beside non-reacted hydrocarbons about 70% nitrogen, 10% water vapor, 13% carbon dioxide (a total of 93% inert gas components), 6% hydrogen, some methane and 1 – 2% carbon monoxide. In addition the gas contains small quantities of unidentified components which apparently exert a catalytic influence on the combustion process in the combustion engine as discussed above. Under lean burning conditions which keep simultaneous emissions of carbon monoxide and unburned hydrocarbons at a low level, the emission of nitrogen oxides from the muffler 19 and exhaust pipe 27 is reduced by a factor of 5–10. With a high degree of conversion in the reforming reactor and with no conventional fuel supply, there is a further drastic reduction in the emission of nitrogen oxides.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention. All parts, percentages and ratios used throughout the specification and claims are by volume unless otherwise indicated. The term "combustion" is used herein in its ordinary sense and refers to a rapid combining of oxygen with carbon- and/or hydrogen-containing materials.

I claim:

1. A method for the reduction of the amount of polluting components in the flow of exhaust issuing from an Otto cycle internal combustion engine, which method comprises; before delivery of engine fuel to a combustion chamber of the engine, passing at least part of the fuel through a reforming reactor with a reforming catalyst disposed therein and at a temperature between about 250°C. and 1000°C.; delivering water to the reforming reactor to convert in the reforming reactor at least a part of the fuel to carbon monoxide and hydrogen by reaction with steam; delivering between about 5 and about 50% of the flow of exhaust gas from the combustion engine to the reforming reactor; and mixing therein the exhaust gas and the fuel introduced into the reforming reactor whereby at least a portion of the water in the reforming reactor is provided by water in the exhaust gas.

2. The method of claim 1, wherein the exhaust gas flow delivered to the reforming reactor amounts to between 10 and 25% of the exhaust gas flow from the combustion engine.

3. The method of claim 1, wherein the amount of fuel that is converted to carbon monoxide and hydrogen in the reforming reactor is greater than 10% of the amount of fuel delivered to the reforming reactor.

4. The method of claim 1, wherein a portion of the water in the reforming reactor is delivered to the reforming reactor from a water tank.

5. The method of claim 1, wherein the fuel comprises a petroleum fraction and at least part of the remainder of the exhaust gas which is not delivered to the reforming reactor is in heat exchange with the reforming reactor.

6. As apparatus for the reduction of the amount of polluting components in the flow of exhaust issuing from an Otto cycle internal combustion engine, which apparatus comprises; a reforming reactor operatively connected to a fuel tank and the combustion engine; an active reforming catalyst disposed in the reactor for catalyzing reaction conversion of at least part of the fuel to hydrogen gas and carbon monoxide; conduit means for carrying a part of the exhaust gas from the engine to the reforming reactor to be mixed with fuel therein; and valve means connected to the conduit means for regulating the flow of exhaust gas therein.

7. The apparatus of claim 6, further comprising; a water supply; water conduit means for carrying the water from the water supply to the reforming reactor; and valve means connected to the water conduit means for regulating the flow of water therein.

8. The apparatus of claim 6, further comprising air conduit means for supplying air to the reforming reactor.

9. The apparatus of claim 8, further comprising heat exchanger means for exchanging heat between the air in the air conduit means and exhaust gas from the engine.

10. The apparatus of claim 6, further comprising; heating means for maintaining the reforming reactor at a reforming reaction temperature, the heating means disposed adjacent the reforming reactor.

11. The method of claim 1, wherein the fuel comprises a lower alcohol, lower alkane or mixtures thereof.

12. The method of claim 1, wherein the reforming reactor is used as a heat source for motor and coupe heaters.

13. The apparatus of claim 6, further comprising heat exchanger means for exchanging heat between the reforming reactor and motor and coupe heaters.

* * * * *